Fig. 2.

Jan. 2, 1951 A. W. SILVA 2,536,576
AUTOMATIC FISHING DEVICE
Filed June 2, 1947 8 Sheets-Sheet 7

Fig. 7.

INVENTOR.
Alfred W. Silva
BY Victor J. Evans & Co.
ATTORNEYS

Jan. 2, 1951 A. W. SILVA 2,536,576
AUTOMATIC FISHING DEVICE
Filed June 2, 1947 8 Sheets-Sheet 8

INVENTOR.
Alfred W. Silva
BY Victor J. Evans & Co.
ATTORNEYS

Patented Jan. 2, 1951

2,536,576

UNITED STATES PATENT OFFICE 2,536,576

AUTOMATIC FISHING DEVICE

Alfred W. Silva, Gardena, Calif.

Application June 2, 1947, Serial No. 751,929

8 Claims. (Cl. 43—15)

This invention relates to an automatic fishing machine.

It is an object of the present invention to provide an automatic fishing machine adapted to be placed at the rail of a boat to support a rod extended outwardly therefrom and to be set in operation upon a strike of a fish upon the line of the rod whereby to cause the rod to be raised upwardly to draw in the fish and whereby thereafter the rod will be automatically lowered to a down position until a second strike occurs to cause the fish to be lifted inwardly and the rod raised.

It is another object of the invention to provide an automatic fishing machine wherein two rods can be attached to the same machine so that dual oscillating movement of the mechanism on its base can be had whereby to cause both fishing rods to be moved in unison back and forth between front and rear positions on the side of the boat.

Other objects of the present invention are to provide an automatic fishing machine for use by commercial fishermen and adapted to be connected to the side rail of a boat, which is of simple construction, inexpensive to manufacture and efficient in operation.

For other objects and for a better understanding of the invention, reference may be had to the following detailed description taken in connection with the accompanying drawing, in which.

Figure 7:
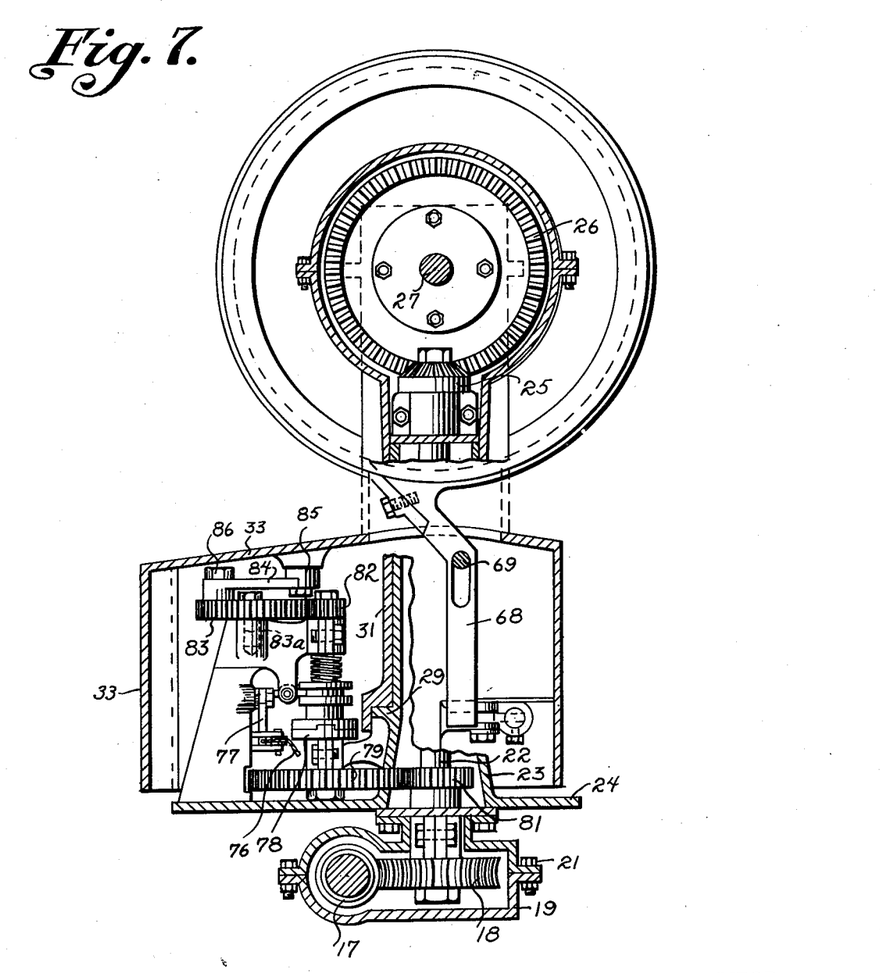
Fig. 7 is a cross-sectional view taken generally on line 7—7 of Fig. 1.
Figures 8, 9:
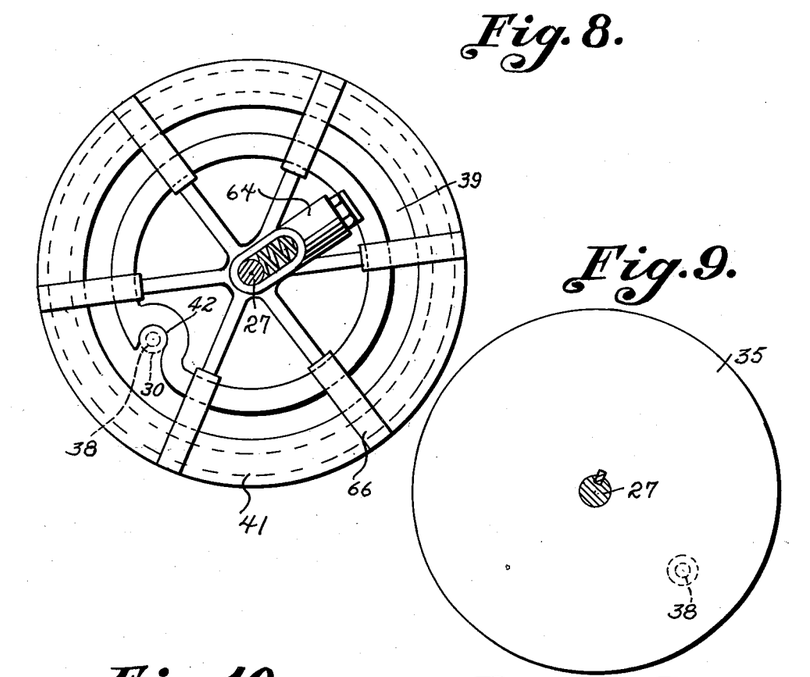
Fig. 8 is an elevational view of the actuating ring with the pin of the driving wheel indicated in dotted lines, and shown in engagement with the notch extending from the groove of the ring.
Fig. 9 is an elevational view of one driving wheel having a pin thereon.
Figure 10:
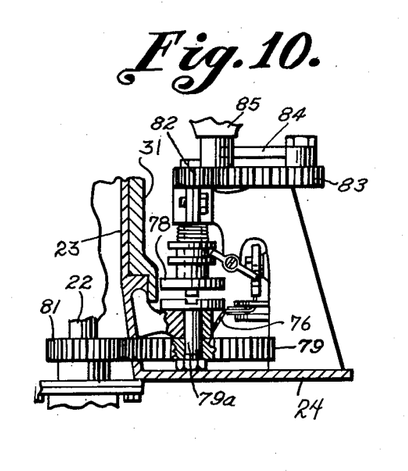
Fig. 10 is a fragmentary view of the gearing and front mechanism which is used for causing the oscillating movement of the mechanism relative to its base.
Figure 11:
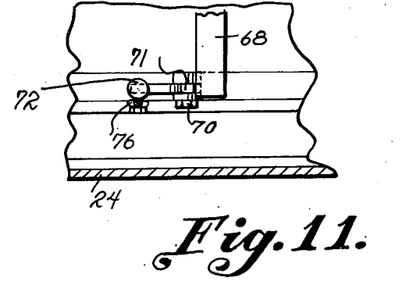
Fig. 11 is a fragmentary view showing the wheel or ring lever and the parts for operating the driving clutch of the mechanism which oscillates the rods back and forth along the side of the boat.

Referring now to the figures, 15 represents the side rail of a boat along which there extends a shaft 16 adapted to power any one or several of my automatic fishing machines which may be connected to the boat rail. On the shaft 16 is a worm 17 engaging with a worm wheel 18 as shown in Figure 7. Surrounding the worm 17 and the worm wheel 18 is a housing 19. This housing 19 can be separated by removing bolts 21. The worm wheel 18 is fixed to a vertically extending shaft 22 which extends upwardly through a sleeve portion 23 rising from a base 24. The shaft has fixed to its upper end, a bevel pinion 25 meshing with a bevel plate gear 26. Fixed to the plate gear 26 is a horizontally extending shaft 27 which is constantly rotated. This shaft 27 has a flange 28 thereon for connecting the same with the plate gear 26. On the sleeve 23 is a horizontally extending shoulder or flange 29 on which is rested a sleeve 31 extending downwardly along the sleeve 23 and concentric therewith. The sleeve 31 can be rotatably adjusted on the supporting sleeve 23 whereby parts connected therewith can be oscillated back and forth in a horizontal plane. At the upper end of the sleeve 31 are bearing brackets 32 which support the shaft 27. The sleeve 31 has housing portions connected with it whereby these portions and the parts thereon will likewise be oscillated. At the bottom of the housing portion, as may be indicated at 33, is a roller 34 operable over base 24 which supports the outer part of the housing 33.

The shaft 27 extends in opposite directions from the plate gear 26 so as to operate driving wheels 35 of different rod lifts. Each side of the shaft has a clutch device 36 which can be released by the operation of a hand lever 37 as when the wheel 35 may have become entangled with the lines or for any other reason when it is desirable to stop a wheel 35.

The driving wheel 35 has a pin projection 38 extending from one face thereof on which a roller 30 is journalled and the roller travels in a groove 39 of an actuating ring 41 so as to normally retain the ring 41 concentrically upon the wheel 35. The roller 30 bears against the ring on the outer side of the groove 39 continuously until the ring is acted upon by an external force. Extending inwardly from the groove 39 in the ring 41 is a notch 42 which the roller 30 of the wheel 35 may enter when force is applied by a rod holder 43 as a rod thereon has been acted upon by a fish striking a line extending from the same. The rod holder 43 is pivotally connected to an outwardly extending bracket 44 pivoted on the exterior of housing 33 and rod 45 carried in the holder will, when pulled upon by a fish, through an upwardly extending eye projection 46, cause a catch lever 47 to be pivoted on a pin 47a, to release a compressed spring 48 disposed within a cylinder 49 pivotally connected at 50 to housing 33. The catch lever is slidable through the eye 46.

Figure 1:
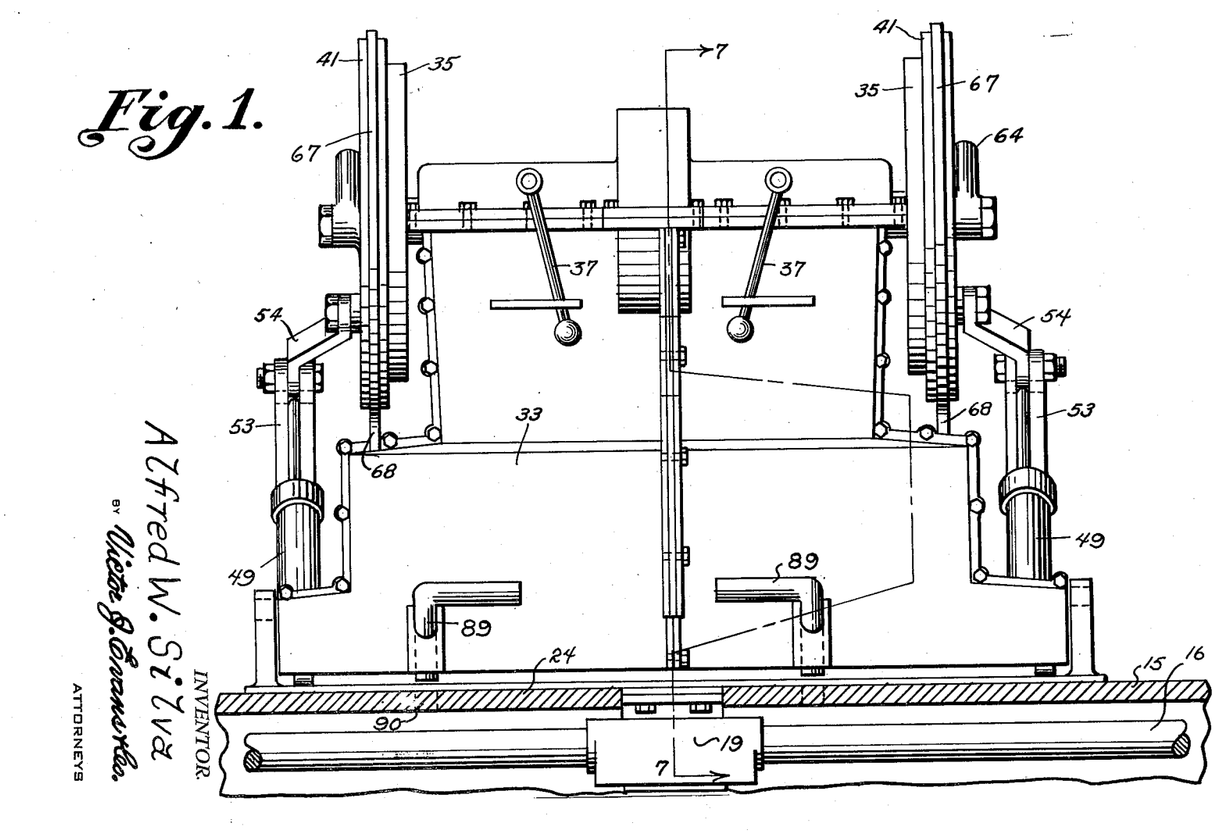
Fig. 1 is a rear elevational view of my automatic fishing machine mounted upon the rail of a boat and embodying the features of the present invention.
Figure 2:
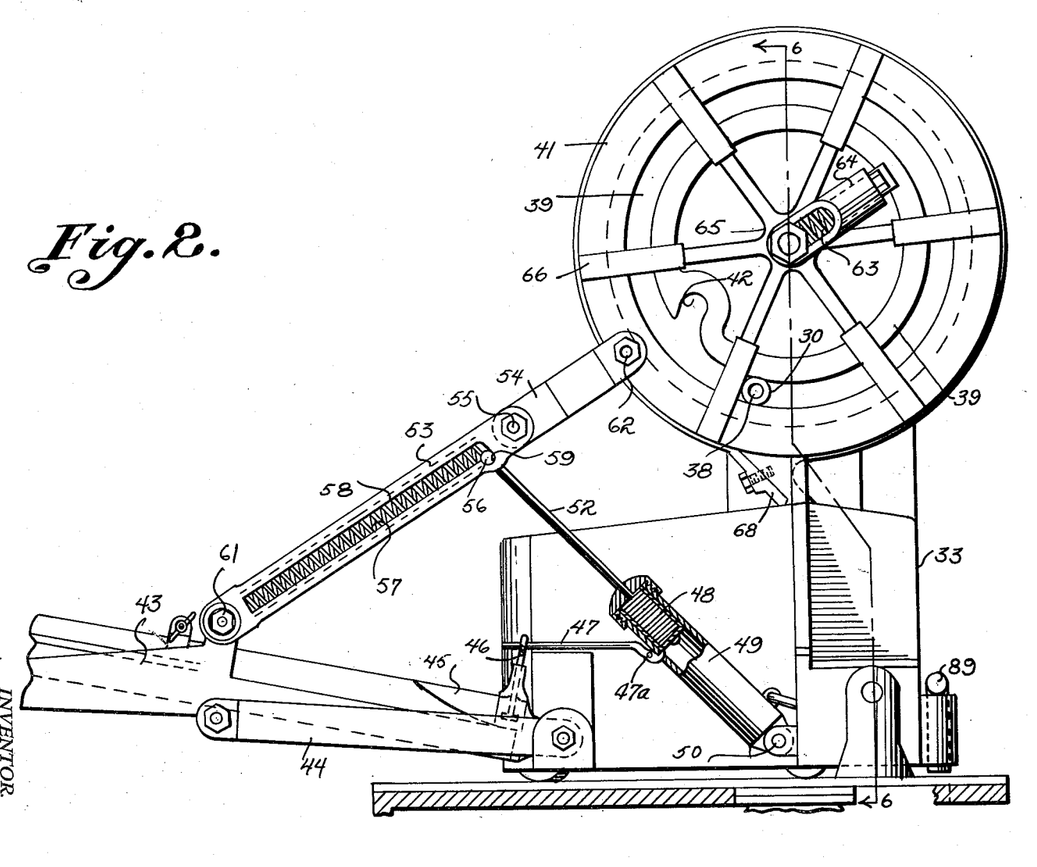
Fig. 2 is a side elevational view of my automatic fishing machine with the rod holder in a lowered position.

A rod 52 extends from the cylinder 49 for connection with links 53 and 54 pivotally connected together by a bolt 55. The end of the rod 52 has a head portion 56 which is slidable in a slot 58 of the link 53 and is normally maintained by a spring 57 in a notch 59 at the end of the slot 58 adjacent to the pivot connection 55 as shown in Figure 2. The holder 43 has link 53 pivotally connected to it as indicated at 61. The link 54 is pivotally connected as indicated at 62 to the ring 41.

Figure 3:
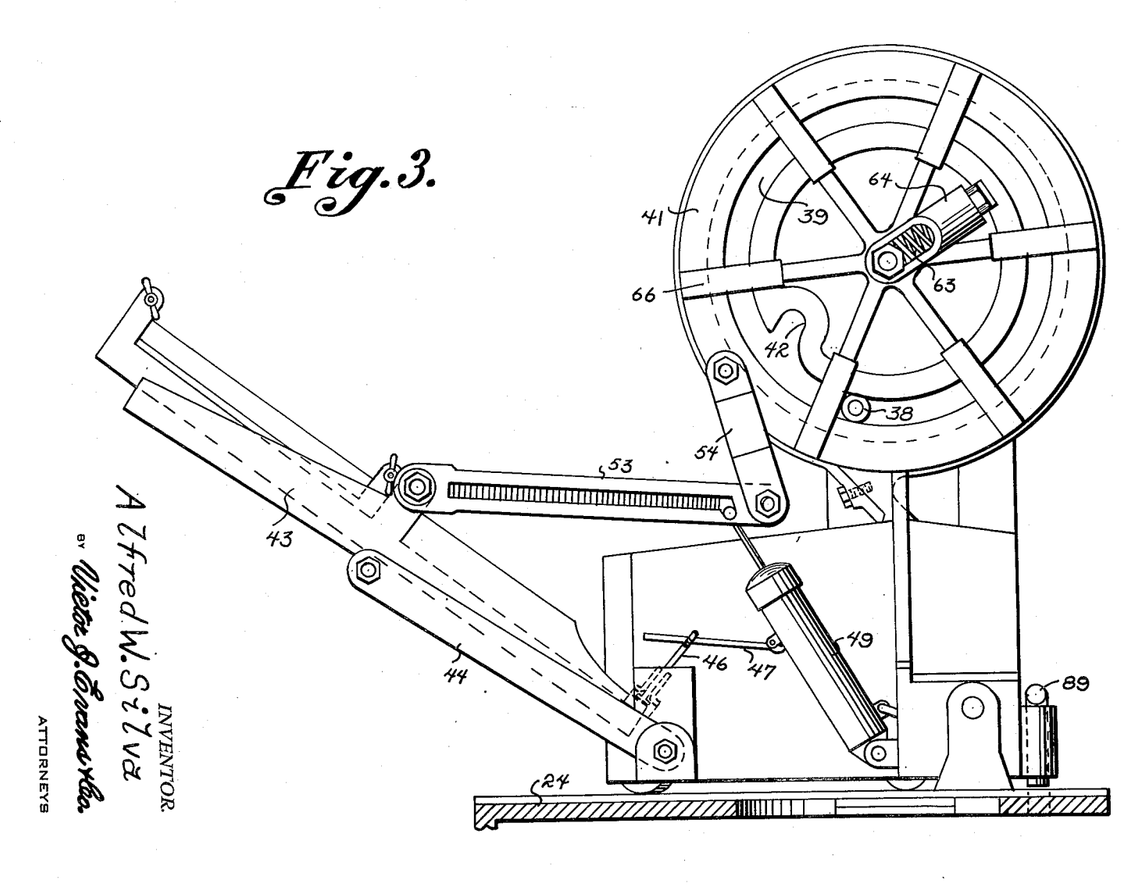
Fig. 3 is a similar side or end elevational view of the machine where the rod holder has been moved to a partly raised position by the tripping of the spring device.

As the links 53 and 54 are released, the effect is to cause the ring 41 to be drawn outwardly so that the pin 38 with the roller 30 of the wheel 35 will enter notch 42 of the groove 39 of the ring whereby to permit the outward and downward displacement of the ring relative to the driving wheel 35 as shown in Figure 3. At this time the pull on the links 53 and 54 by the spring 48 is sufficient to overcome a return spring 63, in a sleeve 64 fixed to and extended laterally from the end of drive shaft 27 and when the roller 30 reaches a position in line with the notch 42 the ring 41 will snap to one side compressing the spring 63, the roller entering the notch 42. The sleeve 64 is connected to a hub portion 65 of radially extending spokes or guides 66 of the ring 41.

Figure 4:
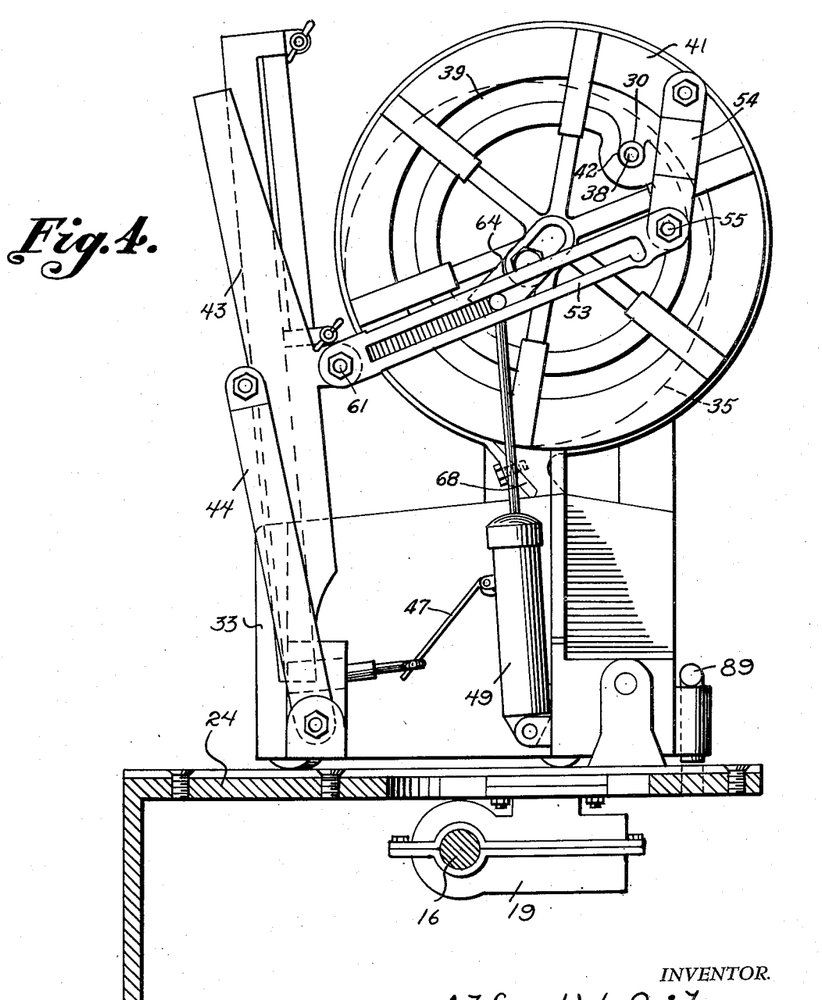
Fig. 4 is a similar side or end elevational view after the rod holder has been raised to nearly a vertical position by the clutch ring.
Figure 5:
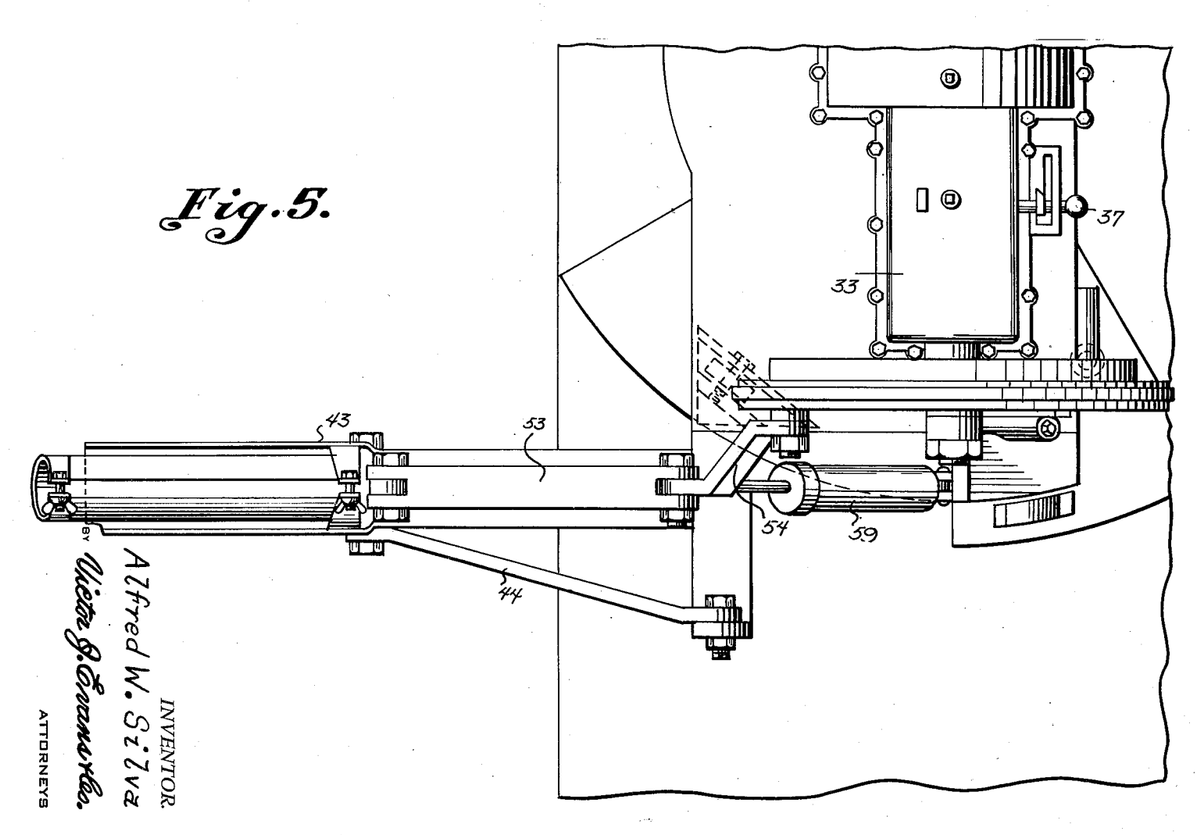
Fig. 5 is a fragmentary top plan view of the automatic fishing machine.
Figure 6:
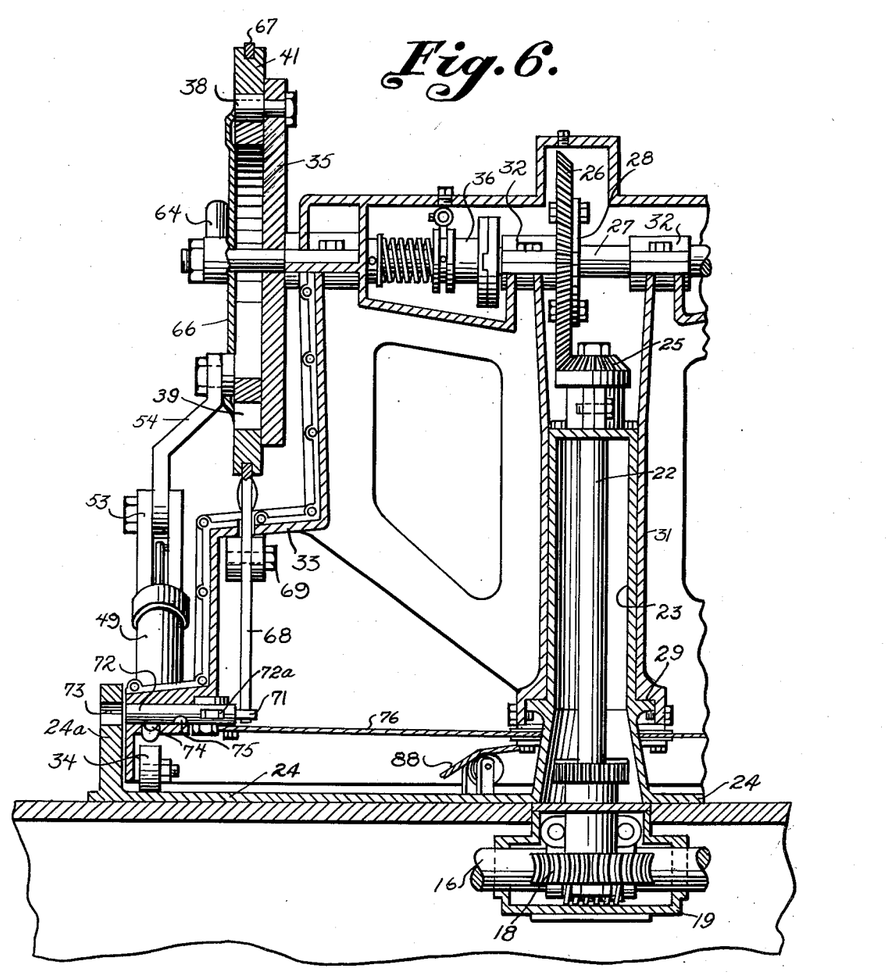
Fig. 6 is a cross-sectional view, in elevation, taken on line 6—6 of Fig. 2.

Thereafter continued rotation of the wheel 35 causes the roller 30 to carry the ring 41 around to the position shown in Figure 4, and the links 53 and 54 will be carried upwardly and over so as to cause the rod to which the fish line is connected to be raised in the manner shown in Figs. 3 and 4 until the rod and its holder has reached a position as shown in Fig. 4. The wheel and ring will have made substantially one half revolution. At this time the spring tension of spring 48 is ineffective and spring 63 will come into play to cause the ring 41 to be returned to its original position and the projection 38 and roller 30 on the first wheel 35 relieved from the notch 42 whereby to permit the independent rotation of the ring and the return of the fishing rod and holder to the normal lowered position. If another strike of a fish is effected the operation of the mechanism in the manner just described is repeated. The fish will be raised out of the water to make it helpless.

Surrounding the ring 41 is a ring 67 which has an arm 68 extending downwardly therefrom and the arm is pivoted on a pin 69 to the housing 33 as shown in Figure 7. The lower end of the arm 68 is connected to a lever 71 which is pivotally mounted in the housing 33 on a bolt 70, and the opposite end of the lever extends into a slot 72a in a bolt 72 that is positioned to register with and slide into an opening 73 in an extension or flange 24a of the base 24. This arm 68 is pivoted to cause a lever 71 to be rocked and the bolt 72 to enter the hole 73 in the upwardly extending flange 24a of the base 24 whereby to lock the housing against oscillating movement. Bolt 72 is held in the hole 73 by a pin 74 that snaps into a notch 75 in the bolt.

A cable 76 is connected to the bolt 72 and is pulled simultaneously with the movement of the bolt into its locked position whereby to cause clutch operating mechanism 77 to be operated to disengage its parts 78 and disengage the drive connection between shaft 22 and the housing 33 which serves to effect the oscillation of the housing and the rod whereby the housing will be held stationary.

This drive mechanism includes a large gear 79 on a stub shaft 79a which is adapted to be driven by a pinion 81 on the shaft 22 and which is connected through clutch parts 78 with a pinion 82 which meshes with a gear 83. A link 84 is pivotally connected at one end by a pin 85 to the top of the housing 33 where it is pivotally anchored and at the other end by a bolt 86 to the gear 83. The gear 83 is rotatably mounted on a pin 83a and accordingly by this drive mechanism as the gear is rotated the housing 33 is oscillated.

The arm 68 is actuated by the ring 41 as the pin 38 with the roller 30 enters the notch 42 and in this movement the lower end of the arm 68 moves the pin 72 into the opening 73 through the lever 71 so that as the fishing rod is elevated after a fish strikes the oscillating instrumentalities of the device are thrown out of gear and the housing is held stationary.

As the rod and its holder is returned to its normal fishing position the housing 33 will be released from the base 24 and the oscillating movement will be resumed.

Should the boat be moving, it will be unnecessary for the housing or carriage to be oscillated and accordingly the driving clutch parts 78 can be disengaged by means of a hand cable 88 extending to the exterior of the machine and adapted to be locked with some part thereof not shown and locking dogs 89 dropped into holes 90 in the base 24.

While only one wheel device has been described it will be seen that there are two such wheel devices, one at one side and one at the other side of the machine and that the operation of either one will stop the oscillating movement of the housing or carriage and wherein independent manual control can be had of either one of the wheel devices to free the same to relieve a line therefrom which may have become entangled therewith.

It should now be apparent that there has been provided an automatic fishing machine for use by commercial fishermen whereby as the fish strike the line, the rod and its holder will be released and be raised upwardly to substantially a vertical position whereby to draw the head of the fish out of the water and at the same time the oscillating movement of the carriage is stopped.

While various changes may be made in the detail construction, it shall be understood that such changes shall be within the spirit and scope of the present invention as defined by the appended claims.

I claim:

1. An automatic fishing machine adapted to be connected to a boat, comprising a housing structure, power means within the housing structure, a fishing rod, a holder adapted to receive the fishing rod and pivotally connected to the housing structure, and means responsive to the pull upon the rod by the striking of a fish for automatically effecting the raising of the rod and its holder to an elevated position, said latter means being connected to the power means to receive the power therefrom for effecting the lifting movement, said responsive means comprising a wheel connected to the power means to be rotated thereby, said wheel having a projection thereon, a ring adjacent the wheel having an annular groove therein through which the projection of the wheel may normally travel, a foldable linkage connected between the rod holder and the ring, a spring operated mechanism for folding said linkage, and a trip device operated by the holder for releasing the spring operated mechanism, the groove of the ring having a notch into which the projection of the wheel may be extended, said ring being adapted to be displaced upon the wheel whereby to cause the projection of the wheel to be engaged with the notch of the groove so that the wheel and ring will serve to effect a raising of the links and the holder as they are revolved by the power means.

2. An automatic fishing machine adapted to be connected to a boat comprising a housing structure, power means within the housing structure, a fishing rod, a holder adapted to receive the fishing rod and pivotally connected to the housing structure, and means responsive to the pull upon the rod by the striking of a fish for automatically effecting the raising of the rod and its holder to an elevated position, said latter means being connected to the power means to receive the power therefrom for effecting the lifting movement, means for oscillating the housing structure whereby to swing the rod and holder when in the down position, drive means extending from the power means to the housing structure to oscillate the same, said driving means including disengageable means, and means extending between the wheel lifting device and the power means for automatically disengaging the drive mechanism to stop the oscillating movement of the housing structure.

3. An automatic fishing machine adapted to be connected to a boat comprising a housing structure, power means within the housing structure, a holder adapted to receive a fish rod and pivotally connected to the housing structure, and means responsive to the pull upon the rod by the striking of a fish for automatically effecting the raising of the rod and its holder to an elevated position, said latter means being connected to the power means to receive the power therefrom for effecting the lifting movement, means for oscillating the housing structure whereby to swing the rod and holder when in the down position, drive means extending from the power means to the housing structure to oscillate the same, said driving means including disengageable means for automatically disengaging the drive mechanism to stop the oscillating movement of the housing structure, a base on which the housing structure is mounted to oscillate, and a latch for securing the housing structure to the base operable by the lifting device.

4. An automatic fishing machine having a base adapted to be connected to the side rail of a boat, a carriage connected to the base for oscillating movement, a rod holder and rod pivotally connected to the carriage for vertical pivotal movement, a wheel device mounted upon the carriage including a wheel part adapted to normally have free rotation and a ring part adapted at times to be engaged with the wheel part whereby to cause the lifting of the rod holder and rod, means for driving the wheel, releasable means connected to the driving means for the wheel for effecting the normal oscillation of the carriage, trip means connected between the rod holder and rod and including the ring to effect the raising of the rod holder and rod, said trip means being responsive to the pull upon the rod holder by the striking of a fish, and means extending between the wheel and the driving means for the carriage whereby to release the driving parts and to stop the movement of the carriage.

5. An automatic fishing machine comprising a housing adapted to be connected to a boat, a shaft journalled in the housing, power means for rotating said shaft, wheel means on the shaft comprising a wheel and a ring adapted at certain times to be engaged whereby the shaft will drive both the wheel and ring, a holder for a fish rod pivotally connected to the housing for vertical movement and adapted to contain a fishing rod, a trip mechanism associated with the holder, links extending between the holder and the ring to draw the ring outwardly whereby when the trip mechanism is operated engagement of the ring is effected and the rod and the holder will be raised to substantially a vertical position by the wheel device, and automatic means for releasing the ring from the wheel when the rod and holder have been raised to a predetermined substantially vertical position.

6. In a fishing rod holder, the combination which comprises a base having mounting means for retaining a holder on a rail of a boat, a rod support pivotally mounted on said base, means pivotally mounting the handle of a fishing rod in said support, a wheel rotatably mounted on and positioned above said base, a ring having an annular groove therein positioned against a face of said wheel, the groove of said ring having a notch in one side thereof, a roller on the wheel positioned to travel in the groove of the ring, pivotally connected links providing a brace connecting the rod holder to the said ring, means responsive to the strike of a fish on a line carried by a rod in the holder for folding the links to elevate the rod, and means rotating the wheel to actuate the ring to further elevate the rod to draw in the fishing line.

7. In a fishing rod holder, the combination which comprises a base having mounting means for retaining a holder on a rail of a boat, a rod support pivotally mounted on said base, means pivotally mounting the handle of a fishing rod in said support, a wheel rotatably mounted on and positioned above said base, a ring having an annular groove therein positioned against a face of said wheel, the groove of said ring having a notch in one side thereof, a roller on the wheel positioned to travel in the groove of the ring, pivotally connected links providing a brace connecting the rod holder to the said ring, means responsive to the strike of a fish on a line carried by a rod in the holder for folding the links to elevate the rod, means adapted to rotate the wheel to actuate the ring to further elevate the rod to draw in the fishing line, and means oscillating the said rod holder laterally.

8. In a fishing rod holder, the combination which comprises a base having mounting means for retaining a holder on a rail of a boat, a rod support pivotally mounted on said base, means pivotally mounting the handle of a fishing rod in said support, a wheel rotatably mounted on and positioned above said base, a ring having an annular groove therein positioned against a face of said wheel, the groove of said ring having a notch in one side thereof, a roller on the wheel positioned to travel in the groove of the ring, pivotally connected links providing a brace connecting the rod holder to the said ring, means responsive to the strike of a fish on a line carried by a rod in the holder for folding the links to elevate the rod, means rotating the wheel to actuate the ring to further elevate the rod to draw in the fishing line, means continuously oscillating the said rod holder laterally before the said rod holder is elevated, and means automatically locking the said rod holder and operating instrumentalities to the base to prevent oscillation thereof as the said rod holder is actuated.

ALFRED W. SILVA.

REFERENCES CITED

The following references are of record in the file of this patent:

UNITED STATES PATENTS

| Number | Name | Date |
|---|---|---|
| 2,489,974 | Norelius | Nov. 29, 1949 |

FOREIGN PATENTS

| Number | Country | Date |
|---|---|---|
| 280,117 | Germany | Nov. 5, 1914 |